Nov. 17, 1931. E. G. MIHALIAK 1,832,647
WEED PULLER
Filed Sept. 4, 1929
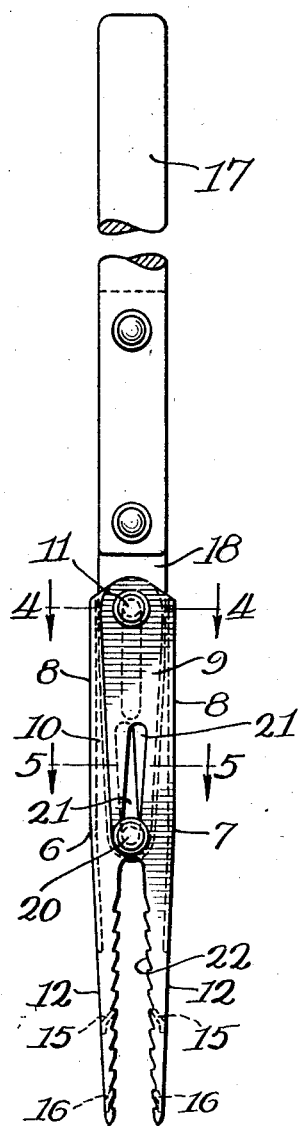
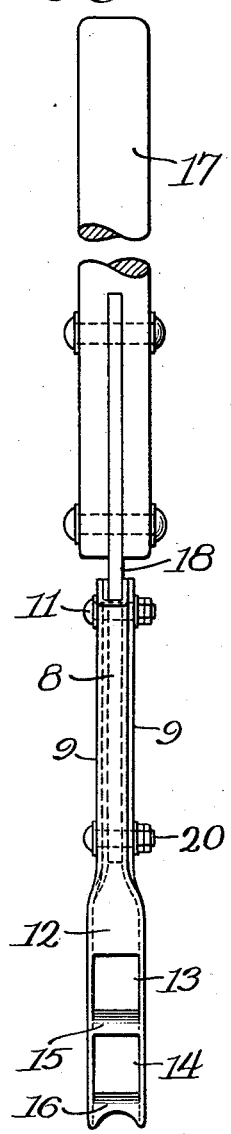
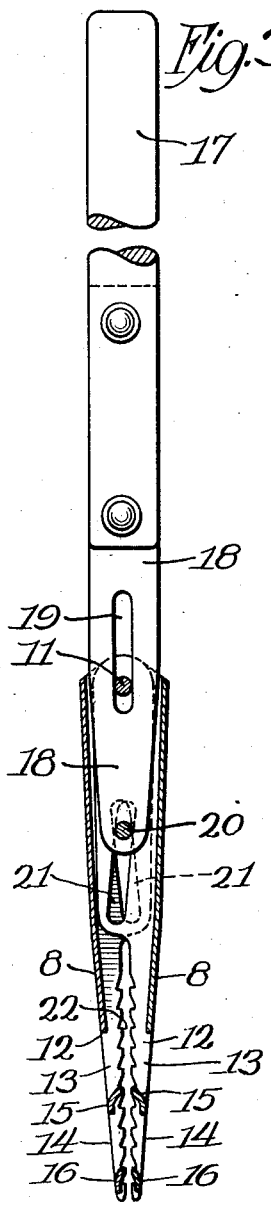
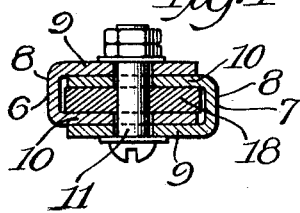
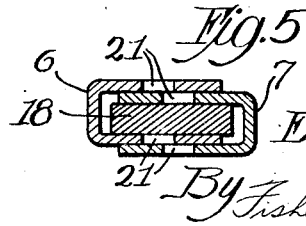
Inventor
Edward G. Mihaliak
By Fisher, Clapp, Soans and Attys.

Patented Nov. 17, 1931

1,832,647

UNITED STATES PATENT OFFICE

EDWARD MIHALIAK, OF BROOKFIELD, ILLINOIS

WEED PULLER

Application filed September 4, 1929. Serial No. 390,387.

This invention relates to weed pullers and more particularly to weed pullers such as are adapted to pulling long rooted weeds such as dandelions and other weeds having long roots similar to the roots of dandelions.

The principal objects of my invention are to provide a weed puller of the class described which will be insertable into the ground and will thereupon, without any manual adjustment whatever, be adapted to grip a comparatively long part of root by the simple operation of withdrawing the device from the ground; to provide means in a device of the type referred to which will prevent roots which have been grasped by the device from slipping out of its grip, and will thus facilitate the removal of all of the root which is originally grasped by the device; to provide means whereby the root gripping elements are adjusted into operative positions as an incident to withdrawal of the griping device from the ground; to provide a device of the class referred to which is strong, durable and effective in use, while being simple in construction and inexpensive to manufacture; and it is the general object of my invention to provide an improved weed puller of the class referred to.

Other objects and advantages of the invention will be understood by reference to the following specification and accompanying drawings, in which I have illustrated a weed puller embodying a preferred form of my invention.

In the drawings:

Figs. 1 and 2 are side and edge elevations respectively.

Fig. 3 is a side view similar to Fig. 1, but showing an adjusted position of the parts, and certain parts being shown in section to facilitate illustration of certain details of construction, and Figs. 4 and 5 are sections on the lines 4—4 and 5—5 respectively of Fig. 1.

Referring now to the drawings, my improved weed puller includes a root gripping device which, in the present embodiment consists of a pair of jaws 6 and 7 which, in the present instance, are generally U-shaped in cross section as clearly indicated in Figs. 4 and 5.

Each jaw includes a back part 8 and side flanges 9 and 10, and the said jaws are pivotally connected adjacent their upper ends by means of a pivot pin 11 which extends through suitable apertures provided in the flanges 9 and 10 of the respective jaws. I prefer to provide the pivot pin 11 in the form of a bolt which is retained in place by means of nuts as shown in Figs 2 and 4 so that if occasion should require, the jaws may be easily disassembled by simply removing the nuts and withdrawing the pivot pin.

The side flanges of the jaws extend from the upper ends thereof downwardly approximately half the length of the jaws at which point the said side flanges are preferably reduced in with as clearly shown in Figs. 1 and 3 so as to form elongated, narrow jaw prongs 12 which are adapted to be inserted into the ground on opposite sides of a root which it is desired to remove. The prong portions of the jaws are provided with openings 13 and 14 in their backs, the said openings being separated by means of cross pieces such as 15 which are preferably integral parts of the jaws, being portions of the backs thereof which are not removed when the openings 13 and 14 are formed. As clearly shown in Figs. 1 and 3, the cross piece portions 15 are preferably bent inwardly and upwardly toward the center to form gripping members whose inner edges are disposed in the planes of the inner edges of the side flanges 9 and 10. The cross piece portions 15 are adapted to cooperate with each other so as to prevent the roots which have been gripped by the jaws from slipping therethrough as the device is withdrawn from the ground. The prong portions are also preferably provided with tie portions such as 16 adjacent their lower ends, the said tie portions 16 being also bent inwardly so that their upper edges are substantially in the planes of the inner edges of the side flanges, and the lower part of the portions 16 are preferably curved as shown so that the root will be induced to slide toward the center of the jaws instead of slipping off.

When the prong portions 12—12 of the jaws are inserted into the ground, they are in open or spread position as shown in Fig. 1, the jaws being located on opposite sides of the root to be removed. By means which I will presently describe, the jaws are caused to swing together into closed or root gripping position substantially as shown in Fig. 3, from an inspection of which it will be apparent that a root disposed between the lower ends of the back portions 8 of the jaws and the cross pieces 15 and 16 will be clamped or gripped there-between, a certain amount of dirt being also gripped around the root so that there is but little danger of cutting the root in the said gripping action. Of course, it will be understood that in Fig. 3, the jaws are shown adjusted almost to their extreme closed position and when in operation, the jaws will close only so far as permitted by the amount of dirt and root embraced thereby.

For effecting adjustment of the jaws into root gripping position, I provide an elongated handle 17 which may be of wood or other suitable material, the said handle being provided with a flat bar-like extension 18 which fits between the innermost of the overlapping side flanges of the jaws. The bar 18 is provided with an elongated slot 19 through which the pivot pin 11 passes, the handle being thereby longitudinally slidably connected to the said jaws. At the lower end of the bar 18, I provide means in the form of a bolt 20 which is fixedly mounted in the lower end of the bar 18 and passes through slots 21—21 which are provided in the side flanges 9 and 10 of the jaws.

The slots 21—21 are inclined slightly up towards its center as shown in Fig. 1, the slots in the flanges of the jaw 6 inclining in a direction opposite to the direction of inclination of the slots in the jaw 7. In the manufacture of weed pullers such as herein disclosed, the jaws 6 and 7 are of like construction, both of them being made from the same forming dies, which fact is highly important from a commercial standpoint because of the attendant economy in cost of equipment for manufacture.

The cross pin 20 carried by the lower end of the bar 18 of the handle normally is located in the lower ends of the slots 21—21 which coincide or register with each other substantially as shown in Fig. 1. When the jaws are inserted in the ground preparatory to removing a root, the parts of the device are in the relative positions shown in Fig. 1. Upon upward movement of the handle 17 to withdraw the jaws 6 and 7, the pin 20 travels in the oppositely inclined slots 21—21 engaging the oppositely inclined edges thereof to force the lower ends of the jaws to move toward each other into root gripping position. The pin 20 and inclined slot arrangement are in the nature of a cam mechanism which causes the jaws to swing on their pivotal connection into the said root gripping position, and it will be apparent that upon downward movement of the handle relative to the jaws, the latter will be opened.

When the device is inserted into the ground, downward force of the handle 17 is transmitted to the jaws 6 and 7 through the agency of the pivot pin 11 which at that time engages the bar 18 at the upper end of the slot 19 and also through the agency of the cross pin 20 which engages the side flanges of the jaws at the bottoms of the slots 21—21. The cross pin 20 is also preferably in the form of a bolt having nuts for normally maintaining the bolt in operative position, the said nuts being readily removable so as to facilitate disassembling of the device as above mentioned. The inner edges of the jaw portions 12—12 may, if desired, be provided with serrations or teeth-like formations 22 which serve to prevent slippage between the jaws, especially in case the jaws are inaccurately positioned around the root, so that the latter is located more or less in line with the side flanges of the said jaws.

An important feature of my invention lies in the cross bars 15 and 16. These bars grip the root as the device is being withdrawn from the ground, and increase the area of contact between the device and the earth and root so that the pulling action of the device is positive, hence any tendency for the root and earth to slip through the jaws is prevented to a large extent by the bars 15 and 16.

I am aware that changes may be made in the above described construction without departing from the spirit of my invention, the scope of which should be determined by reference to the following claims, construing the same as broadly as possible consistent with the state of the art.

I claim as my invention:

1. In a weed puller, the combination of a root gripping device comprising a pair of elongated jaws pivoted together adjacent their upper ends and adapted to be inserted into the ground on opposite sides of a root to be removed, said jaws each comprising a back part and a side flange, the flanges being provided with slots respectively inclined in opposite directions to the vertical when the jaws are open, a handle connected to said jaws so as to be slidable longitudinally thereof, and means carried by said handle and projecting into said inclined slots for cooperating with the adjacent flange edges to adjust said jaws into root gripping position as an incident to upward movement of the handle.

2. In a weed puller, the combination of a root gripping device comprising a pair of elongated jaws, said jaws being adapted to be inserted into the ground on opposite sides of a root to be removed, the upper end portions of said jaws being generally U-shaped in cross section and the side flanges of the respective jaws being disposed in relatively overlapping relation to each other, a pivot pin extending through said overlapping flanges adjacent their upper ends for pivotally connecting said jaws, the side flanges of the said respective jaws being provided with slots inclined in opposite directions to the vertical when said jaws are open, a handle connected to said jaws so as to be slidable longitudinally thereof, means carried by said handle and projecting into said inclined slots for engaging the adjacent edges of the respective jaws to adjust the same into root gripping position as an incident to upward movement of the handle.

3. In a weed puller, the combination of a root gripping device comprising a pair of elongated jaws adapted to be inserted into the ground on opposite sides of a root to be removed, the upper end portions of said jaws being generally U-shaped in cross section and the side flanges of said upper end portions being disposed in relatively overlapping relation, a pivot pin extending through said overlapping flanges adjacent the upper ends thereof, said jaws being thereby pivotally connected and relatively adjustable from normal, open position into root gripping position, and said side flanges of the respective jaws being provided with slots inclined in opposite directions to the vertical and the lower ends of said slots registering with each other when the jaws are open, a handle having its lower end portion fitting between the inner-most flanges of said jaws and provided with a slot through which said pivot pin extends, said handle being thereby connected to said jaws so as to be adjustable longitudinally thereof, and means carried by said handle and fitting into said oppositely inclined slots for cooperating with the adjacent edges of the respective flanges to adjust said jaws into root gripping position after the same are inserted into the ground and as an incident to upward movement of the handle.

4. In a weed puller, the combination of a root-gripping device comprising a pair of hingedly connected elongated jaws, said jaws being adapted to be inserted in open position into the ground adjacent a root to be removed and to be moved to closed position while in the ground, one of said jaws having a cross member provided with a portion inclined to the vertical, whereby the ground engaging said inclined portion during withdrawal of the jaws tends to move said jaw towards the other, thereby facilitating maintenance of said jaws in gripping position during withdrawal thereof.

5. In a weed puller, the combination of a handle, a root-gripping device carried by said handle and comprising a pair of elongated jaws adapted to be inserted into the ground on opposite sides of the root to be removed, said jaws being hingedly connected so as to be relatively adjustable from normal open position into closed root-gripping position, said jaws each including a cross member having a portion inclined to the vertical, whereby the ground engaging said inclined portion during withdrawal of the jaws tends to move said jaws toward each other, thereby facilitating maintenance of said jaws in gripping position during the withdrawal thereof.

6. In a weed puller, the combination of a handle, a root-gripping device carried by said handle and comprising a pair of jaws adapted to be inserted into the ground on opposite sides of the root to be removed, said jaws being hingedly connected so as to be relatively adjustable from normal open position into closed root-gripping position, said jaws each comprising a pair of side members and a cross member extending there-between and having a portion inclined to the vertical, whereby the ground engaging said inclined portion during withdrawal of the jaws tends to move said jaws towards each other, thereby facilitating maintenance of said jaws in gripping position during the withdrawal thereof.

7. In a weed puller, the combination of a handle, a root-gripping device carried by said handle and comprising a pair of jaws adapted to be inserted into the ground on opposite sides of the root to be removed, said jaws being hingedly connected so as to be relatively adjustable from normal open position into closed root-gripping position, said jaws each comprising a pair of spaced side members rigidly united adjacent their outer edges so as to form a root-receiving chamber between the jaws when in closed position, each of said side members being serrated on its inner edges for preventing slippage of material engaged between said jaws.

8. In a weed puller, the combination of a handle, a root-gripping device carried by said handle and comprising a pair of jaws adapted to be inserted into the ground on opposite sides of the root to be removed, said jaws being hingedly connected so as to be relatively adjustable from normal open position into closed root-gripping position, said jaws each including a pair of side members, a cross member connecting the lower ends thereof, and a second cross member spaced upwardly from said lower cross member, one of said cross members having a portion inclined to the vertical, whereby the ground engaging said inclined portions during withdrawal of the jaws tends to move said jaws toward each other, thereby facilitating maintenance of said jaws in gripping position during the withdrawal thereof.

9. In a weed puller, the combination of a root-gripping device comprising a pair of elongated jaws pivoted together and adapted to be inserted into the ground on opposite sides of a root to be removed, said jaws each comprising a back part and substantially parallel side flanges extending laterally from said back part, a cross member extending between said flanges, the inner edges of the cross members of the respective jaws being adapted to cooperate with each other so as to prevent material engaged between said jaws from slipping there-through, a handle connected to said jaws so as to be slidable longitudinally thereof, and means carried by said handle and cooperating with said jaws for adjusting said jaws into root-gripping position as an incident to upward movement of the handle.

10. In a device of the class described, the combination of relatively adjustable jaws adapted to be inserted in the ground for gripping a root to be removed from the ground, a handle for manipulating said jaws, and connecting means between said handle and jaws for effecting adjustment of the latter to gripping position as an incident to upward movement of the handle.

11. In a weed puller, the combination of a pair of elongated jaws pivoted together and adapted to be inserted into the ground on opposite sides of a root to be removed, a handle connected to said jaws and slidable longitudinally thereof, said handle constituting means for facilitating manual insertion and withdrawal of said jaws in and from the ground, co-acting cam means connecting said handle and jaws intermediate the pivotal connection between the jaws and the lower ends of the jaws for adjusting the latter into root-gripping position, said cam means being operative as an incident to upward movement of said handle.

12. In a weed puller, the combination of a pair of jaws adapted to be inserted into the ground on opposite sides of the root to be removed, handle means for manipulating said jaws, the latter being connected so as to be relatively adjustable from normal, open position into closed, root-gripping position, one of said jaws including an elongated member having a serrated edge and an element extending laterally from said member for widening the gripping width of said member.

EDWARD MIHALIAK.